(12) United States Patent
Nagaraja

(10) Patent No.: US 8,364,131 B2
(45) Date of Patent: Jan. 29, 2013

(54) METHOD AND APPARATUS FOR PROVIDING CALLER RECOGNITION BASED ON BIOMETRIC DATA AND BIOMETRIC MOBILE DEVICE ADDRESS BOOK

(75) Inventor: Nagendra Nagaraja, Karnataka (IN)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 12/467,279

(22) Filed: May 17, 2009

(65) Prior Publication Data
US 2010/0291909 A1 Nov. 18, 2010

(51) Int. Cl.
*H04M 3/42* (2006.01)
(52) U.S. Cl. ............... 455/415; 455/550.1; 713/186; 340/5.81; 340/5.82; 340/5.83
(58) Field of Classification Search .......... None
See application file for complete search history.

(56) References Cited

U.S. PATENT DOCUMENTS

| | | | | |
|---|---|---|---|---|
| 6,154,727 | A * | 11/2000 | Karp et al. | 705/3 |
| 6,496,571 | B1 * | 12/2002 | Wilson | 379/93.23 |
| 6,591,242 | B1 * | 7/2003 | Karp et al. | 705/2 |
| 2001/0010724 | A1 * | 8/2001 | Murakami | 380/286 |
| 2003/0108158 | A1 * | 6/2003 | Brown et al. | 379/88.01 |
| 2004/0109588 | A1 * | 6/2004 | Houvener | 382/116 |
| 2005/0097131 | A1 | 5/2005 | Benco et al. | |
| 2006/0013446 | A1 * | 1/2006 | Stephens | 382/115 |
| 2007/0174633 | A1 * | 7/2007 | Draper et al. | 713/186 |
| 2007/0217590 | A1 * | 9/2007 | Loupia et al. | 379/202.01 |
| 2007/0248225 | A1 * | 10/2007 | Fluhrer | 380/30 |
| 2008/0253766 | A1 * | 10/2008 | Yu et al. | 398/41 |
| 2011/0176667 | A1 * | 7/2011 | Kumar | 379/142.04 |

FOREIGN PATENT DOCUMENTS

| | | |
|---|---|---|
| GB | 2426890 | 12/2006 |
| WO | WO9811750 | 3/1998 |
| WO | WO0169900 | 9/2001 |

OTHER PUBLICATIONS

International Search Report and Written Opinion—PCT/US2010/035139, International Search Authority—European Patent Office—Sep. 3, 2010.

* cited by examiner

*Primary Examiner* — Lester Kincaid
*Assistant Examiner* — Mehmood B Khan
(74) *Attorney, Agent, or Firm* — James T. Hagler

(57) ABSTRACT

Mobile devices transmit biometric data with a call initiation request to enable caller recognition within a contacts database so that caller information can be displayed even if the incoming telephone number is not recognized. A mobile device used to place a call gathers biometric data, such as a fingerprint scan. To protect user identity information the biometric data may be distorted or otherwise modified. The caller biometric data may be communicated as part of a call initiation process. The called mobile device may include a contacts database which includes within the data records stored biometric data associated with contacts. The called mobile device compares received biometric data to biometric data stored within the contacts database to determine if there is a match. If a match or partial match is determined, the contact record associated with that matching biometric data can be accessed and the associated contact information displayed.

18 Claims, 10 Drawing Sheets

| Name | Phone Number | Biometric | |
|---|---|---|---|
| Janis | 555-555-0001 | [binary data] | 260 |
| Fred | 555-555-0002 | [binary data] | 262 |
| Marie | 555-555-0003 | [binary data] | 264 |
| Sanjay | 555-555-0004 | [binary data] | 266 |

FIG. 6

| Name | Phone Number | Distortion Key | Biometric |
|---|---|---|---|
| Janis | 555-555-0001 | [random number] | [binary data] |
| Fred | 555-555-0002 | [random number] | [binary data] |
| Marie | 555-555-0003 | [random number] | [binary data] |
| Sanjay | 555-555-0004 | [random number] | [binary data] |

FIG. 9

METHOD AND APPARATUS FOR PROVIDING CALLER RECOGNITION BASED ON BIOMETRIC DATA AND BIOMETRIC MOBILE DEVICE ADDRESS BOOK

FIELD OF THE INVENTION

The present invention relates generally to cellular communication systems, and more particularly to methods and apparatus for providing caller recognition based on biometric information provided in a call initiation request.

BACKGROUND

A common feature in mobile communication devices, such as cellular telephones, is a contacts database or address book application in which users can store the names and phone numbers (as well as other information) of individual and business contacts. Another common feature is functionality which receives the telephone number of an incoming call, which is provided as part of the call initiation protocol, and uses that number to look up a contact data record. If a match of the incoming phone number is found within the contact database, the mobile device can display the name and/or image of the caller using information stored in the corresponding contact data record. Such functionality is very popular since it allows mobile device users to know who is calling without having to memorize the phone numbers of their friends and contacts. However, this functionality is only available if the caller is calling from a phone number stored in the contact database. If a caller borrows the phone from another person or changes telephones, this functionality is defeated because the telephone number will not be recognized or will be recognized as that of a different contact.

SUMMARY

Various embodiments utilize biometric data provided with a call initiation request to locate a caller data record within a contacts database so that the caller is information can be displayed even if the incoming telephone number is not recognized or corresponds to a different individual. A mobile device used for initiating a telephone call may include a mechanism for obtaining biometric data, such as a fingerprint scanner. The biometric data may be obtained from the caller as part of the call initiation process (e.g., prior to or during the dialing process) or as part of a device activation or login procedure. The caller biometric data may be stored in the mobile device memory prior to transmission. Additionally, in order to protect user identity information, the caller biometric data may be distorted or otherwise modified so that it cannot be used for other identification or verification purposes. The caller biometric data may then be communicated as part of a call initiation process so that a cellular telephone network can provide the data to a called mobile device similar to the way in which the caller's telephone number is relayed. The called mobile device may include a contacts database or address book which includes within the data records stored biometric data associated with contacts. Such a database may be referred to as a biometry address book. When the transmitted caller biometric data is received, the mobile device compares that data to biometric data is to work within the biometry address book to determine if there is a match. Such a comparison may involve determining and percentage match since there is inherent variability in biometric samples. If a match or close match to biometric data stored in the biometry address book is determined, the contact record associated with that matching biometric data can be accessed and the associated contact information, such as the caller's name and/or photograph, can be displayed. In an embodiment, number may be compared against the contact database to determine if a match exists followed by comparison of the biometric data to the contact database only if the incoming telephone number is not recognized. In another embodiment, the biometric data may be provided to an external server where comparison to a contacts database is performed, and if a match is found, the contact information is forwarded to the mobile device for display. Such capability enables the caller recognition functionality to be independent of the telephone number from which a call is placed.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 6 is a data structure diagram of a data table that may be implemented within a mobile device storing biometric data.

FIG. 9 is a data structure diagram of a data table that may be implemented within a mobile device storing biometric data.

DETAILED DESCRIPTION

Figure 1:
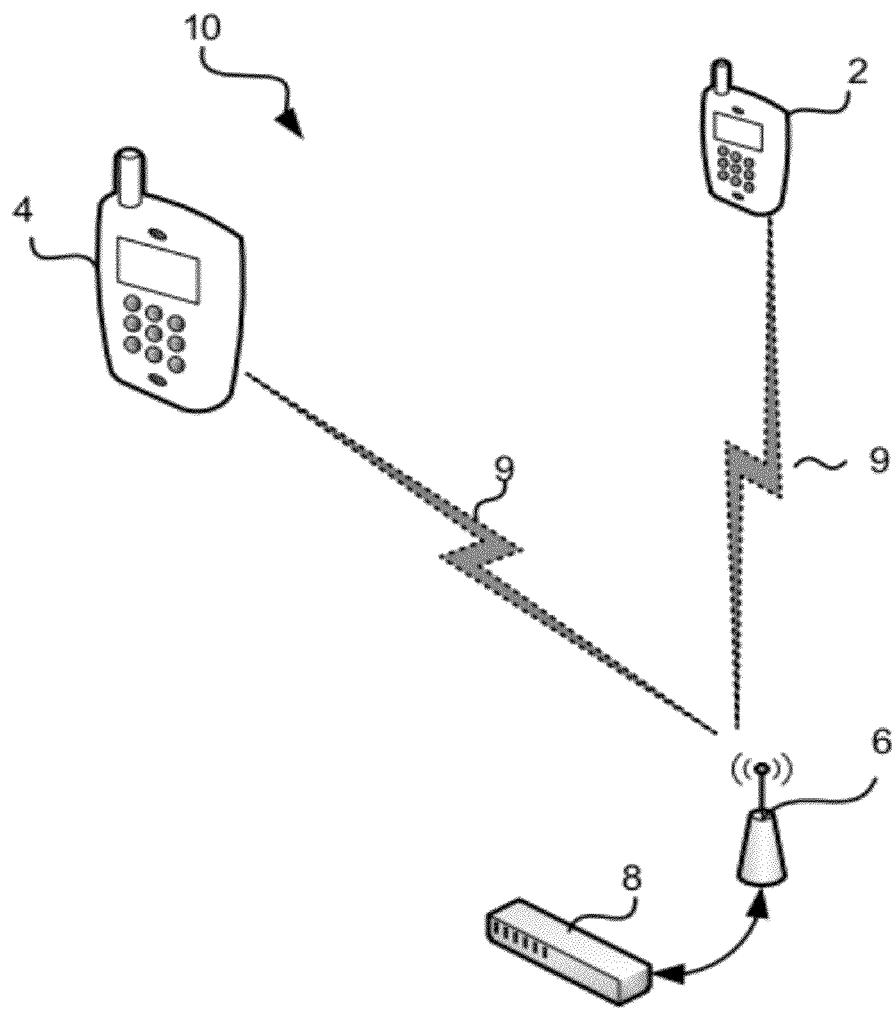
FIG. 1 is a communication system block diagram.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the term "exemplary" is used herein to mean "serving as an example, instance, or illustration." Any implementation described herein as "exemplary" is not necessarily to be construed as preferred or advantageous over other implementations.

As used herein, the term "mobile device" is intended to encompass any form of programmable computer as may exist or will be developed in the future which implements a communication module for wireless voice and data communications, including, for example, cellular telephones, personal data assistants (PDA's), palm-top computers, laptop and notebook computers, wireless electronic mail receivers (e.g., the Blackberry® and Treo® devices), multimedia Internet enabled cellular telephones (e.g., the iPhone®, and similar personal electronic devices which include a wireless communication module, processor and memory. In a preferred embodiment, the mobile device is a portable computer with a software defined radio based chipset module.

Various embodiments utilize biometric data provided with a call initiation request to locate a caller data record within a contacts database so that the caller's information can be displayed even if the incoming telephone number is not recognized or corresponds to a different individual. A mobile device used for initiating a telephone call may include a mechanism for obtaining biometric data from a caller, such as a fingerprint scanner. The caller biometric data may be obtained as part of the call initiation process (e.g., prior to or during the dialing process) or as part of a device activation or login procedure. The caller biometric data may be stored in the mobile device memory prior to transmission. Additionally, in order to protect user identity information, the obtained (i.e., raw) biometric data may be distorted or otherwise modified to create caller biometric data so that it cannot be used for other identification or verification purposes. The caller biometric data may then be communicated as part of a call initiation process so that a cellular telephone network can provide the data to a called mobile device similar to the way in which the caller's telephone number is relayed. The called mobile device may include a contacts database or address book which includes within the data records stored biometric data associated with contacts. Such a database may be referred to as a biometry address book. When the transmitted caller biometric data is received, the mobile device compares that data to biometric data is to work within the biometry address book to determine if there is a match. Such a comparison may involve determining a percentage match since there is inherent variability in biometric samples. If a match or close match to biometric data stored in the biometric address book is determined, the contact record associated with that matching biometric data can be accessed and the associated contact information, such as the caller's name and/or photograph, can be displayed. In an embodiment, the number may be compared against the contact database to determine if a match exists followed by comparison of the caller biometric data to the contact database only if the incoming telephone number is not recognized. In another embodiment, the biometric data may be provided to an external server where comparison to a contacts database is performed, and if a match is found, the contact information is forwarded to the mobile device for display. Such capability enables the caller recognition functionality to be independent of the telephone number from which a call is placed.

The various embodiments may be employed in a variety of wired and wireless networks, including for example a wireless network employing cellular data communication links. By way of example, FIG. 1 shows a communication network 10. Such a communication network 10 may include mobile devices 2, 4 which in the illustrated system are configured with a network antenna and transceiver for transmitting and receiving cellular signals 9 from/to a cellular base site or base station (BS) 6. The mobile devices 2, 4 may also be capable of capturing and processing biometric data, as well as sending and/or receiving biometric data over the communication network 10. In this example network 10, the base station 6 is a part of a cellular network that includes elements required to operate the network, such as a mobile switching center (MSC) 18. In operation, the MSC 18 is capable of routing calls and messages to and from the mobile devices 2, 4 via the base station 6 when the mobile devices 2, 4 are making and receiving cellular data calls.

Figure 2:
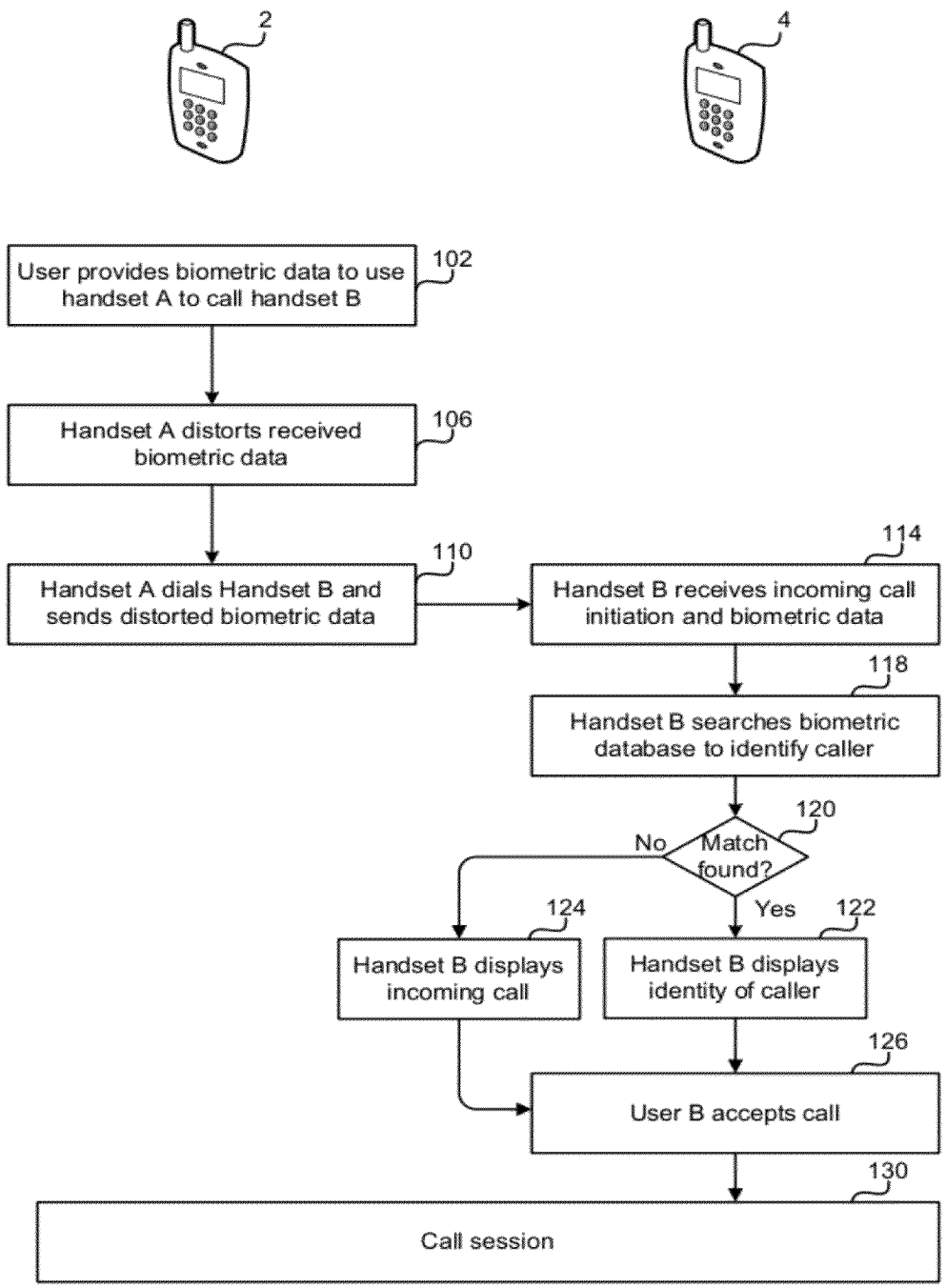
FIG. 2 is a process flow diagram of an embodiment method for providing caller recognition based upon biometric data.
Figure 10:
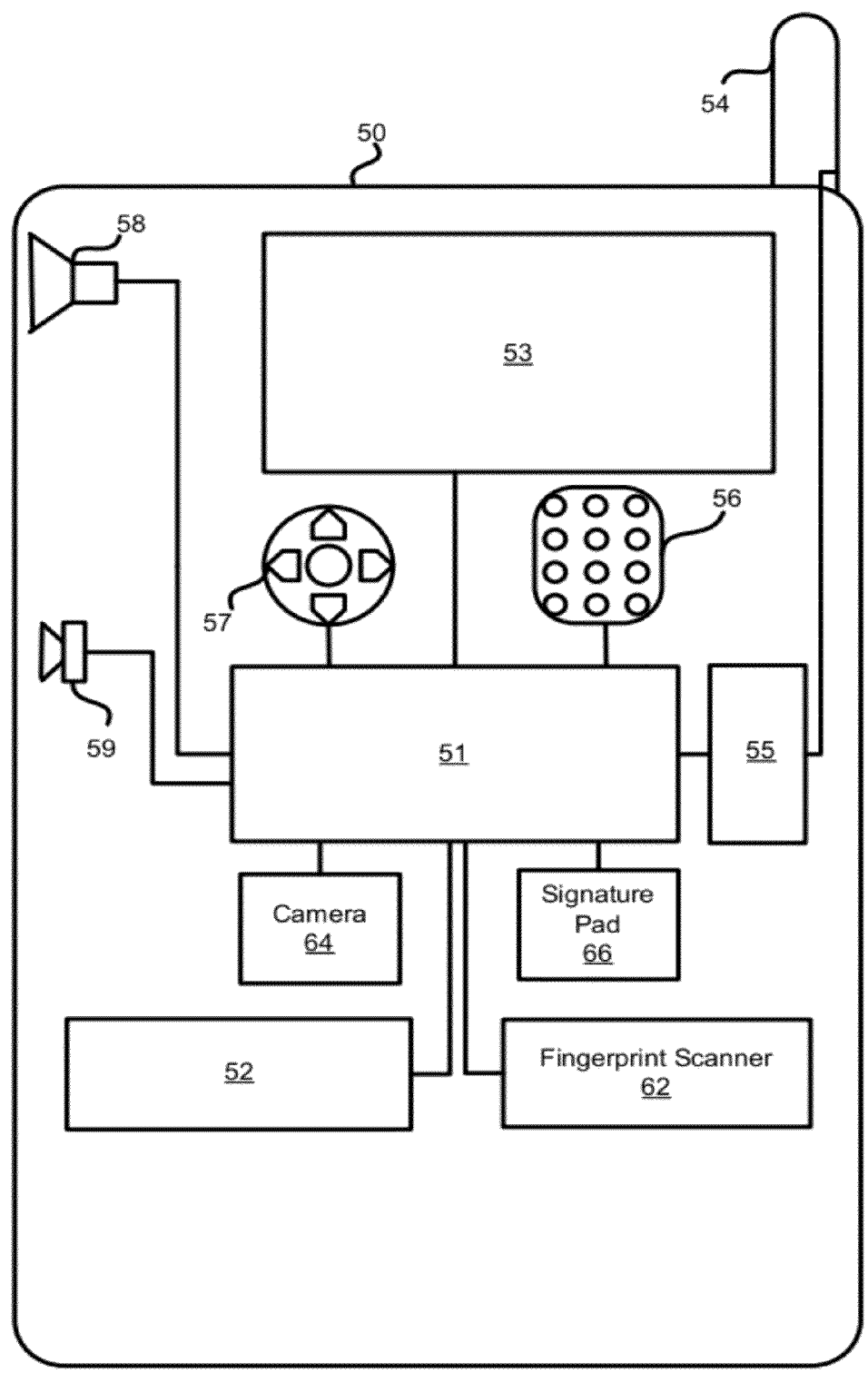
FIG. 10 is a circuit block diagram of an example mobile device suitable for use with the various embodiments.

The communication network 10 may operate in a manner similar to a basic cellular network. FIG. 2 shows the steps that may occur to initiate a call session between two mobile devices 2, 4 in a communication network 10. The user initiating the call (i.e., the caller using mobile device 2) may provide biometric data to the first mobile device 2, step 102. As described more fully below with reference to FIG. 10, the biometric data captured by the mobile device 2 may include any one or more of a variety of biometric information types, including data from scans of a fingerprint, a hand, an iris, a face, or a signature. The captured biometric information may also be or include a voice print or audio file. Capturing the caller's biometric data, step 102, may occur each time a call is initiated, in which case the biometric data may be stored in a temporary memory location of mobile device 2, such as random access memory, and cleared from memory shortly thereafter. Alternatively, capturing biometric data may be accomplished less frequently, such as once daily or whenever the mobile device is turned on. In such cases the biometric data may be stored in the memory of the first mobile device 2, such as in flash memory. As a security precaution the stored biometric data may expire after a predetermined period, such as after 24 hours or after an hour, at which point the data may be erased from memory, requiring the user to resubmit to a biometric scan in order to use the mobile device. In another embodiment, the mechanism for capturing biometric data may be integrated into the security features of the mobile device 2. For example, the caller biometric data may be captured each time the user unlocks the mobile device with the data stored in memory until the phone returns to an idle state.

In another embodiment, the process of capturing biometric data, step 102, includes an error correction and validation process that is applied to the raw biometric data to generate the caller biometric data. The devices and processes for capturing biometric data of a user are prone to error. For example, errors in biometric data may be introduced by the way in which a biometric scan is accomplished, such as when a user swipes a fingerprint scanner in a diagonal direction, by variations in the user's biometric features, such as a scratch or abrasion on the user's finger, and within the scanner device, such as when the scanner is dirty. In order to address this variability in the data capture operation, an embodiment applies an error correction process to the raw biometric data to identify and correct errors in order to generate the caller biometric data. If the errors cannot be corrected, the data may be rejected and the user prompted to repeat the biometric scanning process. In this embodiment, the process of capturing biometric data, step 102, includes capturing raw biometric data, submitting the biometric data to an error correction process and storing the corrected caller biometric data in memory only if errors were sufficiently corrected.

In a further embodiment, the error correction process uses syndrome vectors to generate a syndrome code. A syndrome code is a data structure which characterizes biometric data as a unique number that can be used as a substitute for the raw biometric data. In an embodiment the raw biometric data is subjected to an error correction process that generates a syndrome code which is stored in memory of the mobile device as the caller biometric data (instead of storing the biometric data itself) and transmitted to the recipient mobile device. In this embodiment, the process of capturing biometric data, step 102, includes capturing raw biometric data, subjecting it to an error correction process using syndrome vectors to generate a syndrome code characterizing the biometric data, and storing the generated syndrome code in memory for use as the caller biometric data. The process of generating a syndrome code is repeatable so that the same raw biometric data will result in the same syndrome code number. As such, syndrome codes may not be "cancelable" biometric data as this term is defined below.

In order to protect privacy, biometric data may not be transmitted over the air in native form. Therefore, in an embodiment the mobile device 2 may also distort the biometric data to generate caller biometric data which is stored in memory, step 106. This distortion of the biometric data is a security precaution similar to hashing a password. A unique aspect of biometric data in general is that the physical features used to generate the biometric data, such as fingerprints and retinal patterns, do not change and therefore provide reliable information for identifying or verifying individuals. Thus, if a database storing raw biometric data (e.g., fingerprint data) is compromised the identities of users could be compromised. This is a privacy concern as well as a security concern since compromised biometric data might be used to spoof security systems that rely upon biometric verification methods. This is especially a concern for a network based system, since it might be difficult to distinguish biometric data received from a functional biometric sensor from stored data.

To address privacy and security concerns, raw biometric data may be masked or distorted by the mobile device to generate the caller biometric data that it is transmitted as part of the call initiation process. Various distortion techniques may be employed. A non-reversible distortion operation changes the raw biometric data in a manner that prevents the original undistorted data from being recovered from the distorted caller biometric data. In an embodiment a facial image reading may be distorted in a manner similar to a fun house mirror, making the portions of the face larger or smaller than they actually are. In another embodiment the biometric data itself may be modified, such as by applying a lossy filter that deletes portions of the information so that the entire raw biometric data cannot be reconstructed if it is ever compromised. In a further embodiment the biometric data is modified by submitting it to a mathematical algorithm which may use a distortion function and a distortion key. In this embodiment, the raw biometric data, along with a distortion key, may be passed through the distortion function to produce distorted caller biometric data. The distortion key and function may employ a variety of known distortion functions, including well known encryption functions. Multiple distortion mechanisms may also be employed such as first passing the data through a lossy filter followed by passing the filter output through a distortion function.

In a further embodiment the distortion key may be based on the network identifier of the caller (current user net ID) and/or the recipient (i.e., destination net ID) in combination with a randomly generated key. In a typical cellular network, the network identifier is a number that identifies a mobile device within the network and is not the same as the phone number. This key generation process may be repeatable for each destination user network ID and current user network ID. In this embodiment the key generation and random distortion process may run solely within the secure supervisory mode of the mobile device processor such that no application running on the mobile device can access or otherwise modify the distortion process.

The distortion techniques employed by the various embodiments may be reversible or non-reversible. The output of a reversible distortion technique can be mathematically processed to recover the original input data. This is analogous to encryption and decryption processing since encrypted data decrypted by knowing the encryption key and encryption algorithm, by knowing a decryption key and decryption algorithm, or by a brute force attack. A non-reversible or "one-way" distortion is one which precludes recovery of the original data from the distorted data. This is analogous to hashing a password using the md5 hashing algorithm. Distorted caller biometric data that results from applying a one-way function to raw biometric data may be referred to as being "cancelable." A cancelable security mechanism, whether based on biometric data or otherwise, reduces the security risk due to data being compromised because a compromised data set can be "cancelled" (e.g., deleted from memory) and replaced by a new verification data set which cannot be anticipated or recreated using the compromised data. For example, passwords are cancelable because if a user's password is stolen, the user can create a new password and cancel the old one. With respect to biometric data, cancelable biometric data cannot be used to recover the raw biometric data, and thus cannot be used to create the new distorted biometric data used for security even if the distortion algorithm is known. Thus, cancelable biometric data has the additional benefit of protecting the identity of the user if the data is compromised.

In a further embodiment, raw biometric data is distorted using both a distortion vector that creates non-cancelable biometric data which is then distorted using a one-way distortion algorithm to yield cancelable caller biometric data that is transmitted to the recipient mobile device as part of the call initiation process. In one implementation of this embodiment, the raw biometric data is subjected to an error correction process using syndrome vectors to generate a syndrome code which is then distorted using a one-way distortion algorithm to yield cancelable caller biometric data. This cancelable caller biometric data may then be transmitted to the recipient mobile device as part of the call initiation process as described below.

To initiate a call session, the first mobile device 2 may send a call request to a second mobile device 4 via the cellular network, with the call request including the caller biometric data, step 110. As described above, in the various embodiments the caller biometric data may be any of raw biometric data, distorted biometric data, a syndrome code, or a distorted syndrome code depending upon the particular embodiment that is implemented. In a typical cellular network, the act of dialing a call (i.e., sending a call request) follows a protocol that falls within a class of protocols known as session initiation protocols. When a mobile device dials another telephone number, it sends information to the cellular network that allows the dialing mobile device to be recognized and a communication link established to the called mobile device. In the various embodiments the processes involved in establishing a telephone communication link to another mobile device may include sending the caller biometric data.

The second mobile device 4 may receive the incoming call request from its cellular network, step 114. In a typical cellular network, the incoming call request is part of a session initiation protocol and includes such information as the phone number of the caller. In the various embodiments the incoming call request may include the caller biometric data transmitted from the first mobile device 2 initiating the call. The second mobile device 4 may receive the caller biometric data and compare it with biometric data stored in memory to determine if the identity of the caller is known, step 118. The biometric data matching algorithm may vary from embodiment to embodiment. For example, the matching may utilize a syndrome vector method. Biometric data is continuous rather than discrete, meaning that no two readings of the same source will be identical. Accordingly the process of matching received biometric data to data stored in memory may involve determining a percentage match which is compared to a threshold, rather than a Boolean match/no match test typically used for comparing discrete data sets. The matching process may involve generating a syndrome vector from the received biometric data and the stored biometric data and comparing the two syndrome vectors to determine a percentage match. In one embodiment, the matching process may involve a straight comparison between the received biometric data and the stored biometric data. In other embodiments, the matching or comparison method may require the distortion function and/or the distortion key to be known.

The second mobile device 4 may determine if the received biometric data is an acceptable match for any of the stored contacts, determination 120, such as whether the received data matches the stored data within a threshold margin. If a match is detected (i.e., determination 120="Yes"), the second mobile device 4 may open or recall the contact data record associated with the matched biometric data, step 121, and display the caller identity stored in that data record, step 122. The caller identity information displayed may be the caller's name, photograph, and/or other information stored within the matching data record. If no match is detected (i.e., determination 120="No"), the mobile device 4 may display the incoming call as unknown or unverified, step 124. The user of the second mobile device 4 may then accept the call, step 126, causing a call session to begin, step 130.

Figure 3:
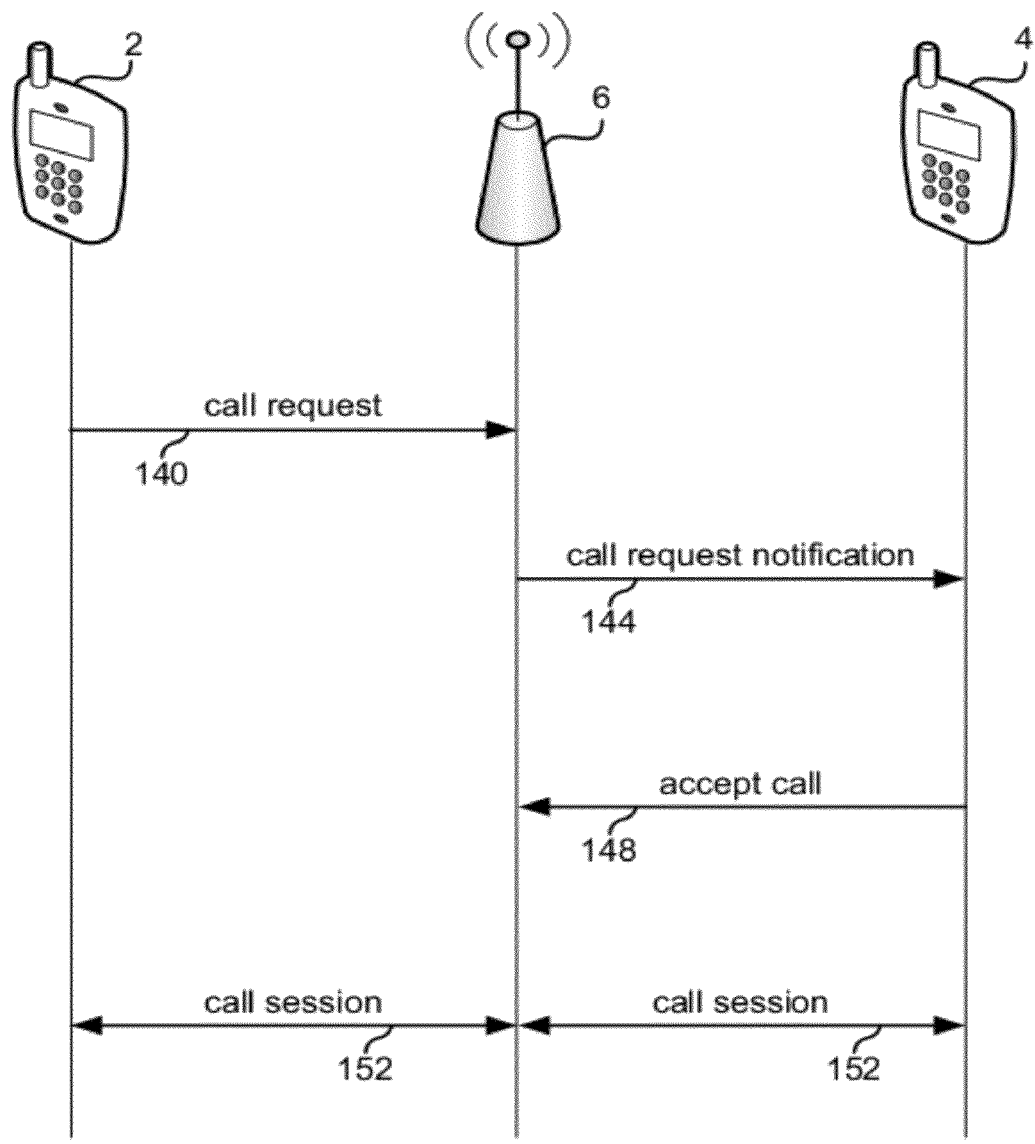
FIG. 3 message flow diagram of representative messages within the communication system illustrated in FIG. 1 to enable caller recognition based upon biometric data.

As previously discussed, a communication network 10 suitable for use with the various embodiments may utilize communication protocols that are similar to or an extension of the protocols used to operate a typical cellular network, such as a session initiation protocol. An overview of the communications that may occur to establish a call in a communication network 10 according to the various embodiments is shown in FIG. 3. The first mobile device 2 may notify its cellular network (via base station 6) of its desire to place a call to the second mobile device 4 in a call request message 140. In a typical cellular network, this call request message 140 may include data to identify the calling mobile device (i.e., first mobile device 2) and the called mobile device (i.e., second mobile device 4), such as telephone numbers and/or network IDs. In the various embodiments, this call request message 140 may also include the caller biometric data. The cellular network may analyze the call request message 140 to determine how to reach the second mobile device 4. If the second mobile device 4 is located on the cellular network, the network (via base station 6) may notify the mobile device 4 of the call, call request notification message 144. In a typical cellular network, this call request notification message 144 may include data to identify the first mobile device 2 such as the caller's telephone number. In a biometrically enhanced communication network 10, the call request notification message 144 may also include the caller biometric data. The second mobile device 4 may notify the cellular network (vie base station 6) that it will accept the incoming call, call acceptance message 148. In a typical cellular network, this acceptance will cause the cellular networks to establish a call session between the two mobile devices as is well known in the cellular communication arts. As would be appreciated by one of skill in the art a call session between two mobile devices may be a series of signals sent between the mobile devices and the base stations which can be referred to collectively as a call session 152.

In some embodiments, more communications may be required to establish a call session 152. For example, the call request notification message 144 may be accompanied by a signal informing the first mobile device 2 that the second mobile device 4 has been notified of the call request. For example, this signal may cause the first mobile device to create a ringing sound in the earpiece. Additionally, the call acceptance message 148 may cause the cellular network to send a signal to the first mobile device 2 that allows it to transition into the call session 152.

In an alternative embodiment the caller biometric data may be transmitted separately from the basic identification data that is relayed in a typical session initiation protocol. In such an embodiment, the call request message 140 may not contain biometric data. Instead, the call request may be relayed to the second mobile device 4 which may, prior to accepting the call, determine whether it can or should receive caller biometric data. Such a determination may be signaled to the cellular network (not shown) in response to which the network may send a request for caller biometric data to the first mobile device 2. The first mobile device may respond by sending the biometric data. Such an embodiment may reduce the amount of bandwidth, particularly in a network where some devices are not configured to receive biometric data. Additionally, in all embodiments certain signals may be constantly sent between the mobile devices and the cellular network as part of network maintenance (i.e., keeping the various mobile devices "connected" to the network).

Figure 4:
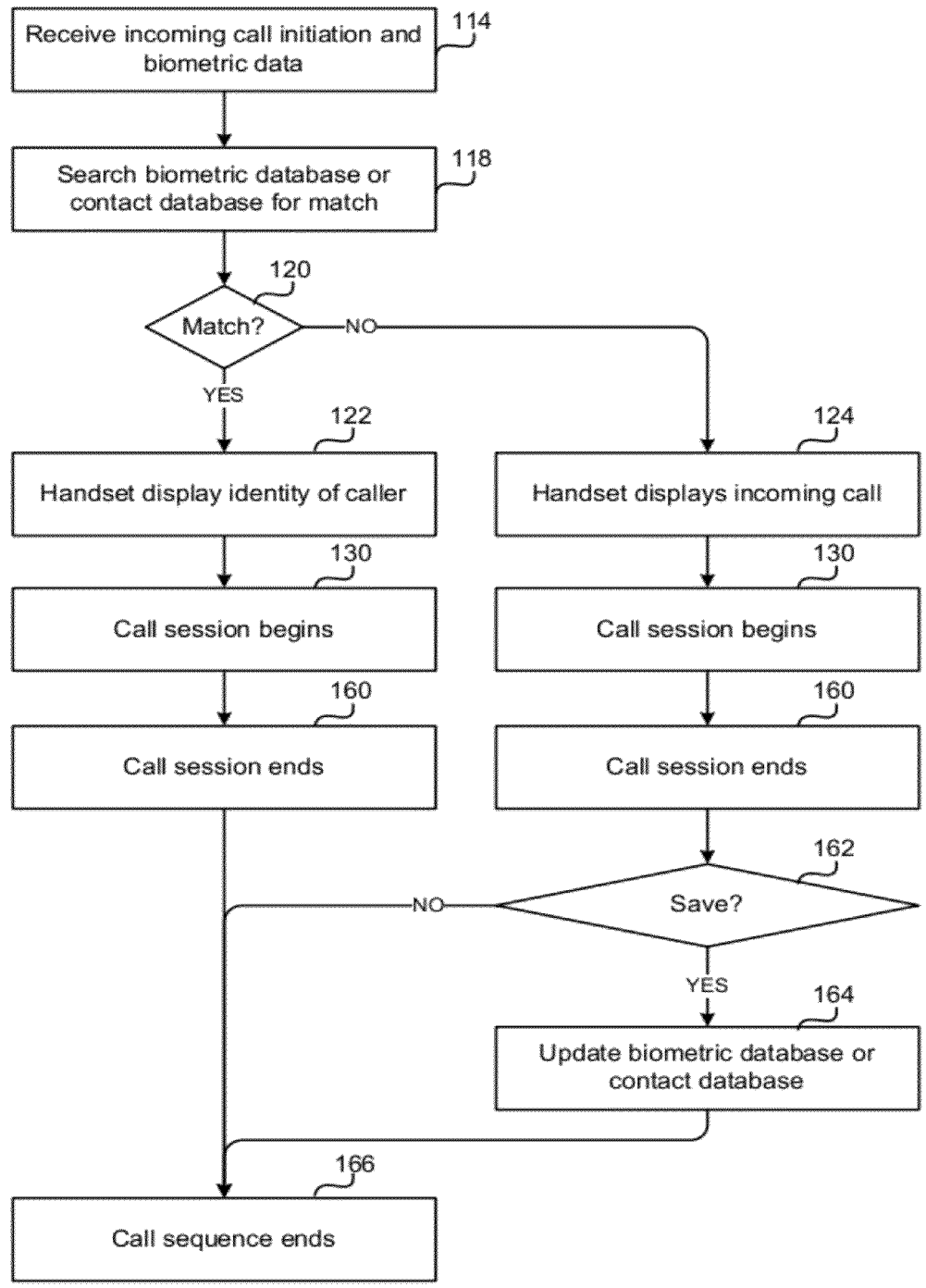
FIG. 4 is a process flow diagram of an embodiment method that may be implemented within a mobile device for recognizing a caller based upon received a biometric data.

Operations that a mobile device in a biometrically enhanced communication network 10 may perform when receiving a call are illustrated in FIG. 4. The mobile device may receive a call initiation request that includes biometric data, step 114. The mobile device may search the contacts database stored in memory to determine if there is a match, step 118. As previously discussed with reference to FIG. 2, searching for a match within the contacts database may involve matching biometric data patterns to determine whether a percentage matching patterns exceeds an acceptable threshold, or generating a syndrome vector and matching it against syndrome vectors stored in memory. Since the operation of comparing biometric data to identify a match can be resource intensive, some embodiments may begin the search with the contact corresponding to the phone number of the incoming call. In such an embodiment the mobile device may determine if the search was successful, determination 120. If so (i.e., determination 120="Yes"), the mobile device may display the identity of the caller, step 122. As discussed above, the caller identity information displayed may be the caller's name, photograph, and/or other information stored within the matching data record. If the user accepts the call, the mobile device may begin the call session, step 130. Eventually the call session ends as one or the other participant hangs up, step 160, at which point the call sequence will end, step 166.

If there is no match to the incoming caller biometric data (i.e., determination 120="No"), the mobile device may display the incoming call without a match, step 124. The user may accept the call which causes the call session to begin, step 130. Eventually the call session ends, step 160, at which point the mobile device may prompt the user to indicate whether the received caller biometric data should be saved in the contacts database and await an input from the user, determination 162. If the user indicates (e.g., by pressing a button or selecting a menu item) that the caller biometric data should not be stored (i.e., determination 162="No"), the caller biometric data may be deleted from temporary memory and the call sequence ended, step 166. If the user indicates (e.g., by pressing a button or selecting a menu item) that the caller biometric data should be stored (i.e., determination 162="Yes"), the mobile device may update the contacts database by storing the received caller biometric data in an appropriate data record, step 164. The operation of storing the caller biometric data may proceed in a manner similar to how conventional mobile devices allow a user to add a phone number to an existing contact or to create a new contact for a caller. For example the database update operation, step 164, may include prompting the user to identify the caller within the contacts database so the caller biometric data can be stored in the corresponding existing contact data record, or to enter the caller's name and other information so a new contact data record can be created into which the caller biometric data can be stored. The calling sequence may end, step 166, before or after the caller biometric data has been saved in the contacts database.

Figure 5:
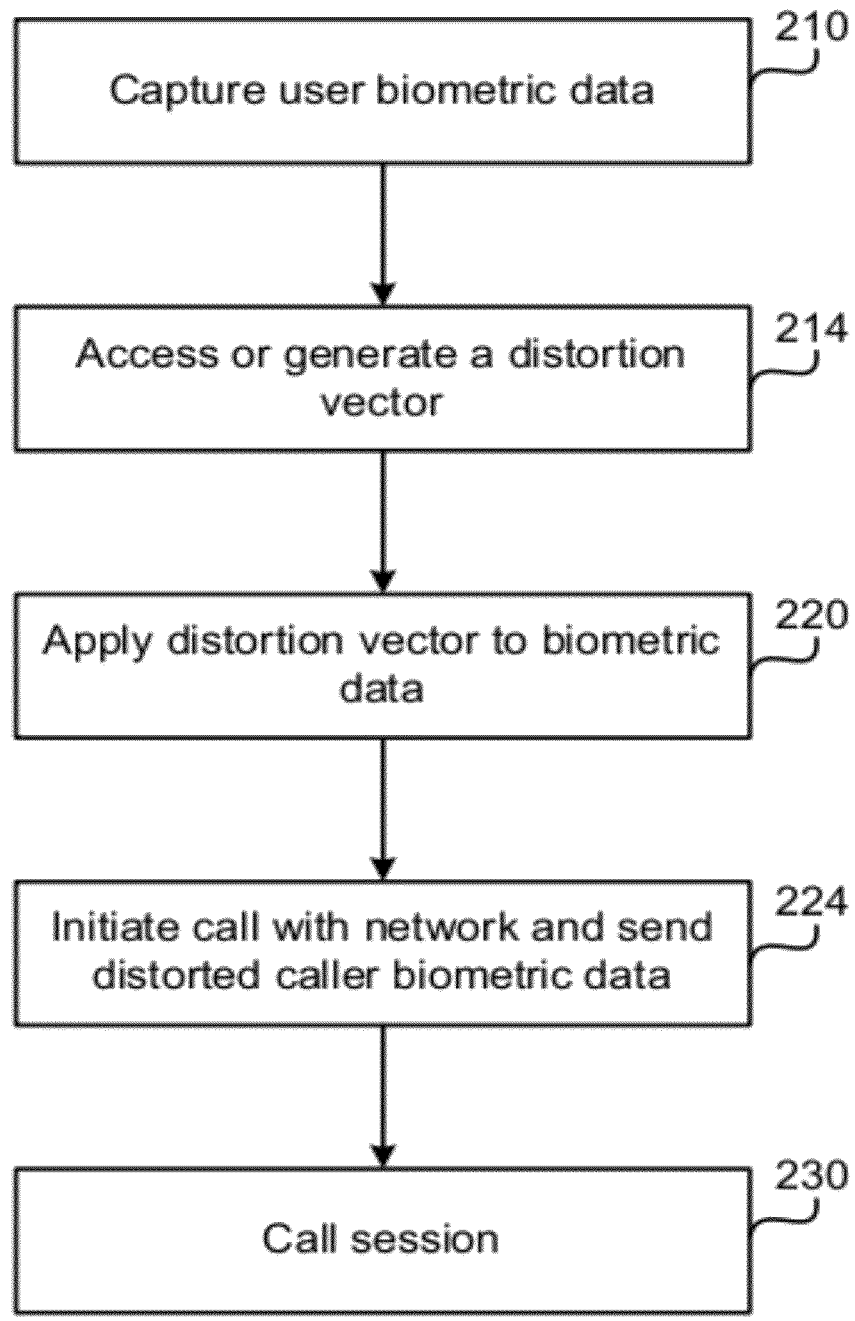
FIG. 5 is a process flow diagram of an embodiment method that may be implemented within a mobile device initiating a call while transmitting biometric data.

Example operations that a mobile device in a biometrically enhanced communication network 10 may take when initiating a call are illustrated in FIG. 5. The mobile device may capture the biometric data of the user, step 210. As previously discussed with reference to FIG. 2, the raw biometric data may be captured each time a call request is made or it may be stored in memory and refreshed periodically. The mobile device may access or generate a distortion vector to be used to distort the raw biometric data, step 214. The mobile device may apply the distortion function to the captured raw biometric data and the distortion vector to generate the caller biometric data, step 220. The mobile device may then send a call initiation request to the cellular network including the caller biometric data, step 224. If the call is accepted by the recipient mobile device the call session may begin, step 230.

As described above, a called mobile device may compare received caller biometric data to biometric data stored locally on the mobile device to determine whether there is a match. Such a local storage may be in the form of a contacts database or a similar biometric database stored in memory of the mobile device. The embodiment method described above with reference to FIG. 5 enables a user to populate the contact database with caller biometric data received with incoming call requests. Additionally, some embodiments may enable the database to be populated with contact biometric data without utilizing a cellular network. Many mobile devices provide for sharing contact information over BlueTooth®, infrared and other wireless communication links between two mobile devices. Some embodiments may use such communication links to also exchange biometric data between two mobile devices, with or without accompanying contact information. The various embodiments may employ methods for sharing contact biometric data that are similar to methods used for sharing other types of contact information between mobile devices. Examples include using a wired (e.g., USB) or wireless (e.g., BlueTooth®, IEEE 802.11, NFC, etc.) communication link between the mobile device and a personal computer. Also, mobile devices may accept biometric data from contacts through email, solid state storage devices (e.g., thumb drives, Secure Digital cards), and over the Internet.

In a further embodiment, users may also acquire biometric data from their contacts by asking each to submit to a biometric scan on the user's mobile device, such as asking each contact to swipe their finger on a fingerprint scanner. In this embodiment the user's mobile device may capture the biometric data and apply error correction and or distortion operations to generate distorted biometric data in a manner similar to that described above with reference to FIGS. 2 and 5. Such distorted biometric data then may be stored within the contacts database. The processes and distortion vectors used to distort the raw contact biometric data should be the same as those implemented by other mobile devices so that received caller biometric data can be matched to a contact biometric data stored in the contacts database.

The various embodiments may integrate the biometric data storage with a typical contacts database. An example data structure of such an integrated database is illustrated in FIG. 6, which shows a data table that may be implemented in a mobile device memory. As would be recognized by one of ordinary skill in the computer arts, data can be represented as a data table, even though it may actually be stored in one or more data structures such as arrays, linked lists, b-trees, or associative arrays. A data table for storing a contacts database may include columns (i.e., fields) relating to characteristics of a contact, such as a name column 250 and a phone number column 254. Each row in the data table may correspond to a single contact, as shown in contact rows 260, 262, 264, 266. Additionally, the contacts data table may contain a biometric data column 258. In the various embodiments the data table may include a biometric data filed column 258 for storing the biometric data that can be compared to caller biometric data transmitted to the recipient mobile device by the caller's mobile device. As previously discussed, the biometric data column 258 may be implemented in a separate data structure that may be linked to the other data columns 250, 254, such as by means of a common index key. Additionally, some embodiments may allow for multiple types of biometric data to be stored within the same data record for a particular contact. In such an embodiment, the contacts data table may have multiple columns for biometric data, such as one for fingerprints, one for retinal scans and one for voice prints.

The various embodiments may vary in the type of distortion key used to distort raw biometric data to generate the caller biometric data. As previously discussed, some embodiments may use the same distortion key on all mobile devices within a biometrically enhanced communication network 10. This embodiment provides the benefit of being device independent. For example, a user will provide the same caller biometric data to the call recipient regardless of the mobile device used to place the call. However, this embodiment may have security disadvantages. A more secure embodiment may use a different distortion key for each called mobile device within the biometrically enhanced communication network 10. This embodiment provides a higher capability for authentication and cancelability since the distortion key used by User C to transmit data to User D may be different from the distortion key used by User C to transmit data to user E. Thus, the caller biometric data received by User D from User C is different than the caller biometric data received by User E from User C. In an embodiment such differences between the two caller biometric data sets is enough that one will not register as a match for the other. In such an embodiment, User D cannot spoof the identity of User C. Thus, Users D could not successfully pretend to be User C by sending caller biometric data received from User C to User E since User E would not recognize the User C caller biometric data sent to User D.

Further security may be achieved by using multiple distortion keys although such embodiments may be less device independent. On the other hand, some degree of device independence can be achieved by using portable address books or portable contacts databases.

Figure 7:
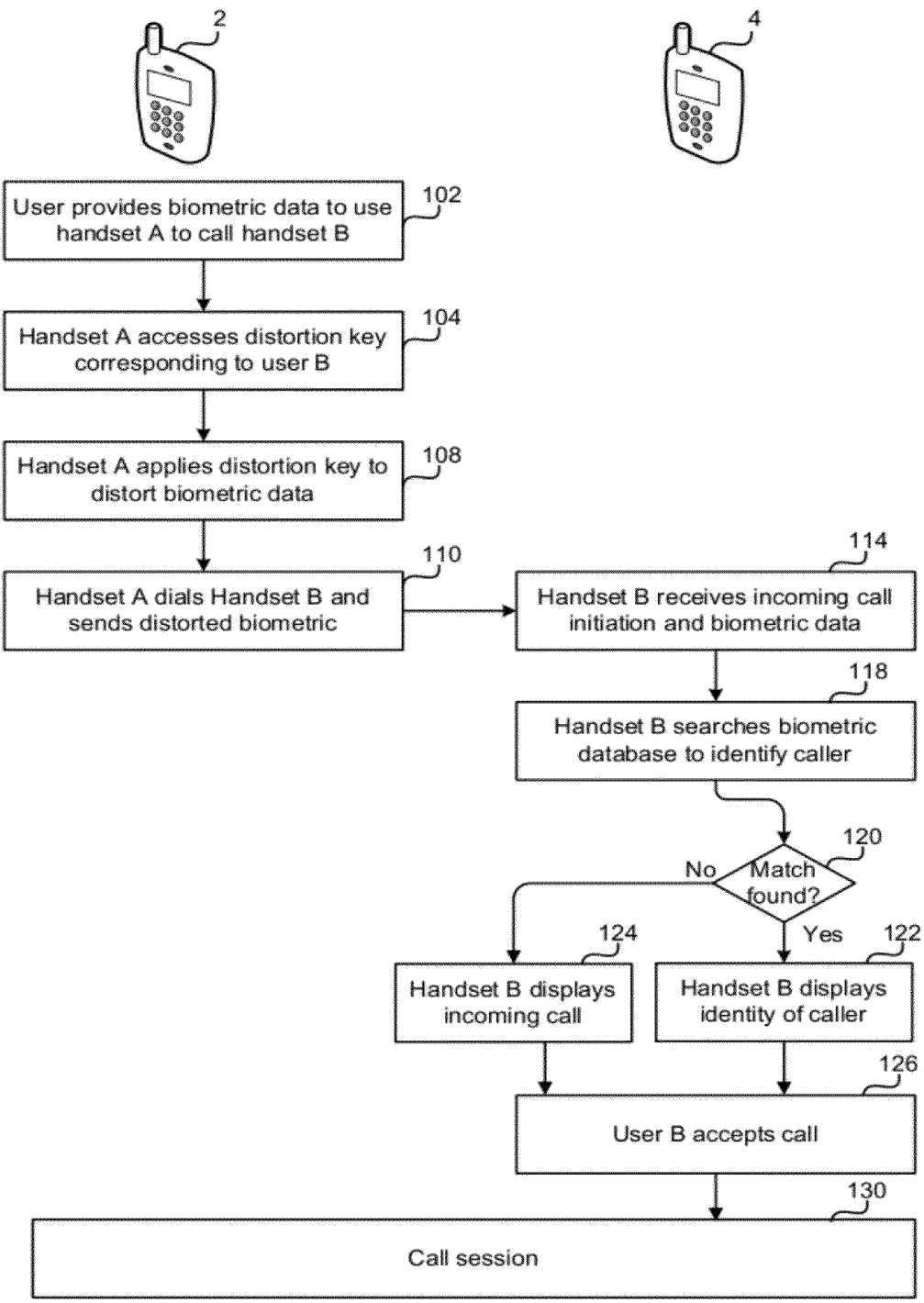
FIG. 7 is a process flow diagram of an embodiment method for providing caller recognition based upon biometric data.
Figure 8:
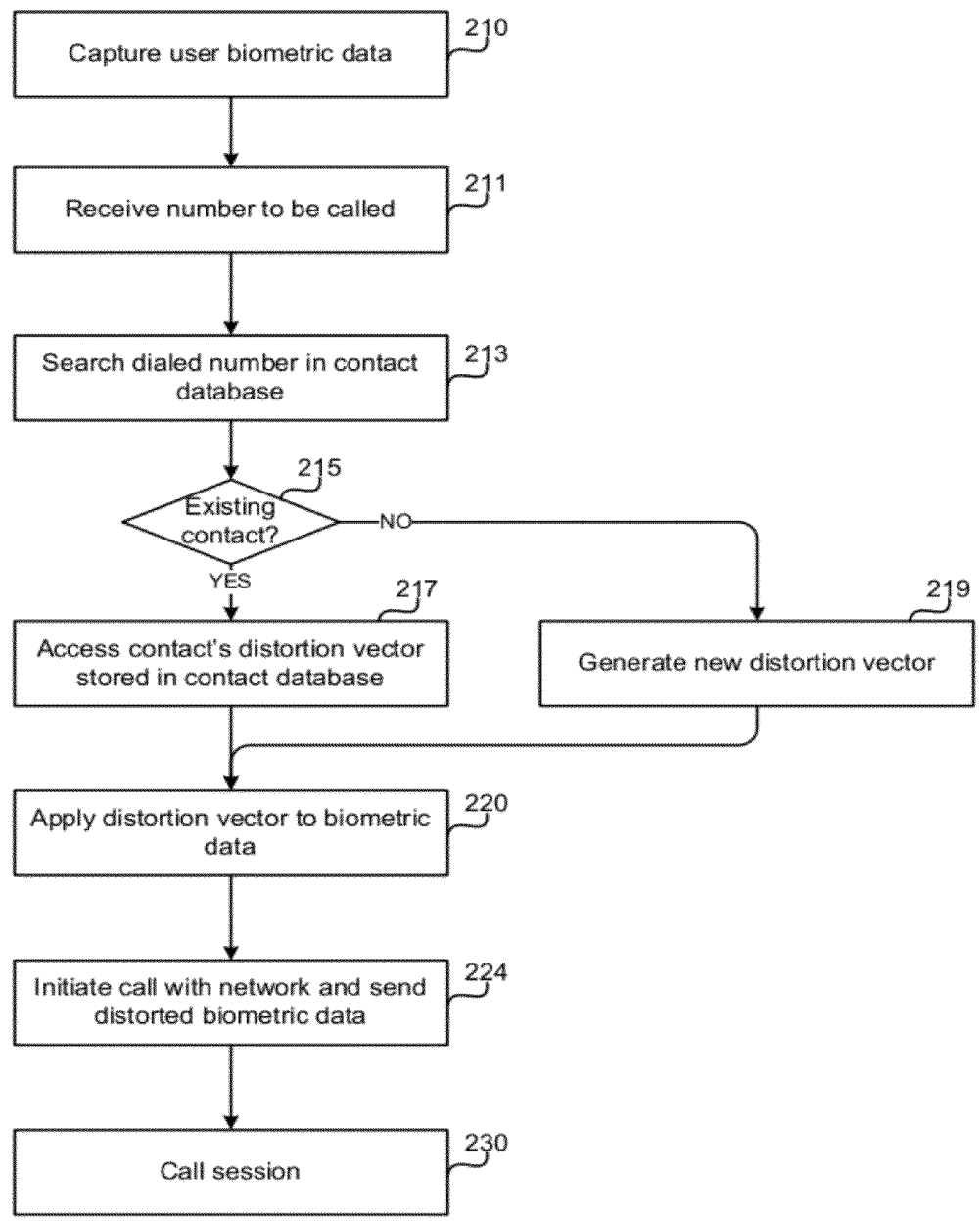
FIG. 8 is a process flow diagram of an embodiment method that may be implemented within a mobile device initiating a call while transmitting biometric data.

FIGS. 7-9 show methods and data structures that may be used to implement multiple distortion key embodiments. The methods shown in FIGS. 7 and 8 are similar to FIGS. 2 and 5, and the data structure in FIG. 9 is similar to that shown in FIG. 6, with the major difference being support for multiple distortion keys. For embodiments in which distortion of biometric data takes place on the dialing mobile device, the network communications and the steps taken by the receiving mobile device may be identical to single-key embodiments. Accordingly, the message flows described above with reference to FIG. 3 and the mobile device implemented methods described above with reference to FIG. 5 may be used in multiple-key and single-key embodiments.

FIG. 7 shows operations that may be implemented to initiate a call session between two mobile devices 2, 4 in a multiple-key embodiment of a biometrically enhanced communication network 10. Before placing a call a user submits to a biometric scan to generate ray biometric data in the first mobile device 2, step 102. The user may also dial the phone number to call. Using the dialed number the first mobile device 2 determines the distortion key to be used for sending caller biometric data to the dialed phone number, step 104. This operation may involve recalling a distortion key stored in memory, such as a network distortion key, or distortion key stored in a field within the contact data record corresponding a contact with the dialed phone number as described below with reference to FIG. 8. Alternatively, this operation may involve using the dialed number (or related information) to generate the distortion key. Using the obtained or generated distortion key the first mobile device 2 distorts the raw biometric data to generate caller biometric data that can be transmitted, step 108, and sends the call initiation request to the caller's cellular network including the information needed to establish a link to the second mobile device 4 (e.g., the dialed phone number) along with the caller biometric data, step 110. The second mobile device 4 receives the call request with the caller biometric data from the recipient's cellular network, step 114. The second mobile device searches the contacts database, step 118, and determines if there is a match to biometric data in a contacts database stored in memory, determination 120. If there is a match (i.e., determination 120="Yes"), the second mobile device 4 displays the identity of the caller as described above with reference to FIGS. 2 and 4, step 122. Otherwise (i.e., determination 120="No"), the second mobile device 4 displays an incoming call notification indicating no match, step 124. If the user accepts the call on the second mobile device 4, step 126, a call session is initiated, step 130.

FIG. 8 shows operations that may be implemented on a mobile device in a multiple-key embodiment of a biometrically enhanced communication network 10 when initiating a call. The mobile device may capture the biometric data of the user, step 210, and receive the number being called, step 211. The mobile device may then search a contacts database for the number being called, step 213, and determine if a contact with that phone number exists, determination 215. If a contact with the dialed phone number exists in the contacts database (i.e., determination 215="Yes"), the mobile device may retrieve the applicable distortion vector from that contact's data record, step 217. If the dialed phone number does not exist in the contacts database (i.e., determination 215="No"), the mobile device may generate a new unique distortion key and store it in the contacts database in conjunction with the dialed number, step 219. As described above, in an embodiment the generated distortion key may be a vector that is generated based on a random number, the network identifier of the calling mobile device and/or the network identifier of the receiving mobile device. In some embodiments, the mobile device will not automatically store the distortion key. Instead it may prompt the user after the call has ended to indicate whether the distortion key should be stored in the contacts database. Using the appropriate distortion key, the mobile device may distort the raw biometric data to generate caller biometric data, step 220, and send the call request along with the caller biometric data to the caller's cellular network, step 224. If the recipient mobile device accepts the incoming call the caller's and recipient's cellular network(s) will initiate a call session, step 230.

FIG. 9 shows an example contacts data table that may be implemented on a mobile device which is part of a multiple-key embodiment of a biometrically enhanced communication network 10. This example data table includes multiple contact data records 261, 263, 265, & 267. Each contact data record may include data fields for storing basic contact data such as a name column 250 and a phone number column 254. Additionally, the contacts data table may include a biometric data field column 258 for storing the contact's biometric data. Also, the contacts data table may include a distortion key data field column 256 for storing the distortion key to be used for distorting raw biometric data to generate the caller biometric data that will be sent to the particular contact.

The embodiments described above may be implemented on any of a variety of mobile devices, such as, for example, cellular telephones, personal data assistants (PDA) with cellular telephone or WiFi capability, mobile electronic mail receivers, mobile web access devices, and other processor equipped devices that may be developed in the future that recognize biometric data and connect to a wireless network. Typically, such mobile devices will have in common the components illustrated in FIG. 10. For example, the mobile device 50 may include a processor 51 coupled to internal memory 52 and a display 53. Additionally, the mobile device 50 will have an antenna 54 for sending and receiving electromagnetic radiation that is connected to a wireless data link and/or cellular telephone transceiver 55 coupled to the processor 51. The processor 51 may be any programmable microprocessor, microcomputer or multiple processor chip or chips that can be configured by software instructions to perform a variety of functions, including the functions of the various embodiments described above. Typically, software applications may be stored in the internal memory 52 before they are accessed and loaded into the processor 51. In some mobile devices, the processor 51 may include internal memory sufficient to store the application software instructions. For the purposes of this description, the term memory refers to all memory accessible by the processor 51, including internal memory 52 and memory within the processor 51 itself. User data files, such as the contacts databases illustrated in FIGS. 6 and 9, are typically stored in the memory 52. In many mobile devices, the memory 52 may be a volatile or nonvolatile memory, such as flash memory, or a mixture of both. Mobile devices typically include a key pad 56 or miniature keyboard and menu selection buttons or rocker switches 57 for receiving user inputs. Mobile devices also typically include a speaker 58 for ringing or reproducing the caller's voice and a microphone 59 for capturing the user's voice to send to the caller.

The various embodiments may include sensors and specialized processors for capturing biometric data. Such sensors may include a fingerprint scanner 62 or a handprint scanner connected to the processor 51. Additionally, the mobile device 50 may include a camera 64 connected to the processor 51 for capturing a facial image. The camera 64 may be distinct from or the same as the camera typically found in traditional mobile device for traditional photography. The various embodiments may employ a signature pad 66 for recognizing handwriting. Alternatively, the display 53 may be a touch screen capable of capturing handwriting via a stylus. The various embodiments may use the microphone 59 for capturing a voice recognition biometric data such as a voice print.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A method for initiating a call session, comprising:
   capturing, at a first mobile device, raw caller biometric data corresponding to a user of the first mobile device;
   initiating a call session from the first mobile device to a second mobile device;
   applying a lossy filter to the raw caller biometric data so that portions of the raw caller biometric data are deleted;
   sending a remaining portion of the raw caller biometric data from the first mobile device to the second mobile device;
   receiving the remaining portion of the raw caller biometric data in the second mobile device;
   comparing the received remaining portion of the raw caller biometric data to biometric data stored in records within a contacts database on the second mobile device to determine when there is at least a partial match to the remaining portion of the raw caller biometric data; and
   displaying information stored in a record within the contacts database when there is at least a partial match of the remaining portion of the raw caller biometric data to the biometric data stored in the record;
   wherein capturing the caller biometric data comprises:
   obtaining biometric data corresponding to the user from a biometric sensor; and distorting the obtained biometric data to create the raw caller biometric data;
   wherein distorting the obtained biometric data comprises:
   processing the obtained biometric data using an error correction process using syndrome vectors to generate a syndrome code; and
   distorting the generated syndrome vector using a one-way distortion algorithm to generate cancelable biometric data which is used as the raw caller biometric data.

2. The method of claim 1, wherein displaying information stored in the record comprises displaying the user's name as stored in the record on the second mobile device.

3. The method of claim 1, wherein distorting the obtained biometric data is accomplished utilizing an error correction process using syndrome vectors to generate a syndrome code which is used as the caller biometric data.

4. The method of claim 1, wherein distorting the obtained biometric data is accomplished utilizing a distortion function and a distortion key.

5. The method of claim 4, wherein distorting the obtained biometric data further comprises:
   selecting the distortion key based on an identity of the second mobile device.

6. The method of claim 4, wherein distorting the obtained biometric data further comprises:
   generating the distortion key based on a network identifier of the first mobile device and a network identifier of the second mobile device.

7. The method of claim 1, wherein comparing the received remaining portion of the raw caller biometric data to biometric data stored in records within a contacts database on the second mobile device to determine if there is at least a partial match comprises:
   determining a percentage match between the received remaining portion of the caller biometric data and biometric data stored in records within the contacts database; and
   determining whether the percentage match exceeds a threshold value.

8. The method of claim 1, wherein sending the remaining portion of the raw caller biometric data from the first mobile device to the second mobile device is accomplished as part of the call initiation protocol.

9. The method of claim 1, further comprising:
   receiving at the second mobile device a telephone number of the first mobile device; and comparing the telephone number of the first mobile device to telephone numbers stored in records within the contacts database to determine if there is a matching telephone number record, wherein comparing the received remaining portion of the raw caller biometric data to biometric data stored in records within a contacts database on the second mobile device to determine if there is at least a partial match is accomplished only if it is determined that there is no matching telephone number in the contacts database.

10. A system, comprising:
    a wireless communication system;
    a first mobile device configured to communicate via the wireless communication system; and
    a second mobile device configured to communicate via the wireless communication system,
    wherein the first mobile device comprises:
    a mobile device memory; and a mobile device processor coupled to the mobile device memory, wherein the mobile device processor is configured with software to perform steps comprising:

capturing raw caller biometric data corresponding to a user of the first mobile device;

applying a lossy filter to the raw caller biometric data so that portions of the raw caller biometric data are deleted;

initiating a call session to the second mobile device;

sending a remaining portion of the raw caller biometric data to the second mobile device, wherein the second mobile device comprises:

a mobile device memory having stored therein a contacts database including a plurality of contacts and associated biometric data; and a mobile device processor coupled to the mobile device memory, wherein the mobile device processor is configured with software to perform steps comprising:

receiving the remaining portion of the raw caller biometric data;

comparing the received remaining portion of the raw caller biometric data to biometric data stored in the contacts database to determine when there is at least a partial match; and displaying information stored in a record within the contacts database when there is at least a partial match of the remaining portion of the raw caller biometric data to the biometric data stored in the record;

wherein the mobile device processor of the first mobile device is further configured with software to perform steps further comprising:

obtaining biometric data corresponding to the user from a biometric sensor; and distorting the obtained biometric data to create the caller biometric data;

wherein the mobile device processor of the first mobile device is further configured with software such that the step of distorting the obtained biometric data comprises:

processing the obtained biometric data using an error correction process using syndrome vectors to generate a syndrome code; and distorting the generated syndrome vector using a one-way distortion algorithm to generate cancelable biometric data which is used as the raw caller biometric data.

11. The system of claim 10, wherein the mobile device processor of the second mobile device is further configured with software such that the step of displaying information stored in the record comprises displaying the user's name as stored in the record on the second mobile device.

12. The system of claim 10, wherein the mobile device processor of the first mobile device is further configured with software such that the step of distorting the obtained biometric data is accomplished utilizing an error correction process using syndrome vectors to generate a syndrome code which is used as the caller biometric data.

13. The system of claim 10, wherein the mobile device processor of the first mobile device is further configured with software such that the step of distorting the obtained biometric data is accomplished utilizing a distortion function and a distortion key.

14. The system of claim 10, wherein the mobile device processor of the first mobile device is further configured with software such that the step of distorting the obtained biometric data further comprises: selecting the distortion key based on an identity of the second mobile device.

15. The system of claim 10, wherein the mobile device processor of the first mobile device is further configured with software such that the step of distorting the obtained biometric data further comprises:

generating the distortion key based on a network identifier of the first mobile device and a network identifier of the second mobile device.

16. The system of claim 10, wherein the mobile device processor of the second mobile device is further configured with software such that the step of comparing the received remaining portion of the raw caller biometric data to biometric data stored in records within a contacts database to determine if there is at least a partial match comprises:

determining a percentage match between the received remaining portion of the raw caller biometric data and biometric data stored in records within the contacts database; and determining whether the percentage match exceeds a threshold value.

17. The system of claim 10, wherein the mobile device processor of the first mobile device is further configured with software such that the step of sending the remaining portion of the raw caller biometric data from the first mobile device to the second mobile device is accomplished as part of the call initiation protocol.

18. The system of claim 10, wherein the mobile device processor of the second mobile device is further configured with software to perform steps further comprising: receiving a telephone number of the first mobile device; and comparing the telephone number of the first mobile device to telephone numbers stored in records within the contacts database to determine if there is a matching telephone number record, wherein comparing the received remaining portion of the raw caller biometric data to biometric data stored in records within a contacts database to determine if there is at least a partial match is accomplished only if it is determined that there is no matching telephone number in the contacts database.

* * * * *